United States Patent [19]
Ho et al.

[11] Patent Number: 5,712,877
[45] Date of Patent: Jan. 27, 1998

[54] PILOT-SYMBOL AIDED CONTINUOUS PHASE MODULATION SYSTEM

[75] Inventors: Paul K. M. Ho, Surrey, Canada; Jae Hyung Kim, Kyungnam, Rep. of Korea

[73] Assignee: Simon Fraser University, British Columbia, Canada

[21] Appl. No.: 451,445

[22] Filed: May 26, 1995

[51] Int. Cl.$^6$ .................................................. H04L 27/10
[52] U.S. Cl. .......................... 375/284; 375/259; 375/262
[58] Field of Search ..................................... 375/259, 261, 375/262, 263, 265, 285, 340, 316, 341, 346, 348; 329/304, 305, 306; 332/103; 371/43, 44, 45

[56] References Cited

U.S. PATENT DOCUMENTS

| | | | |
|---|---|---|---|
| 4,862,483 | 8/1989 | Clark | 375/94 |
| 4,980,767 | 12/1990 | Chao et al. | 358/187 |
| 5,127,051 | 6/1992 | Chan et al. | 380/49 |
| 5,140,615 | 8/1992 | Jasper et al. | 375/348 |
| 5,204,878 | 4/1993 | Larsso | 375/14 |
| 5,222,101 | 6/1993 | Ariyavisitakul et al. | 375/13 |
| 5,260,972 | 11/1993 | Wang | 375/58 |
| 5,381,449 | 1/1995 | Jasper et al. | 375/259 |
| 5,406,585 | 4/1995 | Rohani et al. | 375/340 |
| 5,414,734 | 5/1995 | Marchetto et al. | 375/267 |
| 5,513,215 | 4/1996 | Marchetto et al. | 375/233 |

Primary Examiner—Tesfaldet Bocure
Assistant Examiner—Bryan Webster
Attorney, Agent, or Firm—Cahill, Sutton & Thomas P.L.C.

[57] ABSTRACT

Apparatus for transmitting and receiving digital information over mobile communication channels. The apparatus includes a pilot symbol insertion device for periodically inserting data dependent pilot symbols into frames of digital data for subsequent channel estimation, a continuous phase modulator for modulating and transmitting over a mobile communication channel the frames of digital data and means for receiving and filtering the transmitted data. A channel estimator estimates the channel amplitude and phase distortion from the received pilot signal at different time instants. Means are provided for demodulating the received signal and for decoding the demodulated signal to recover the estimated transmitted data.

29 Claims, 9 Drawing Sheets

PILOT-SYMBOL AIDED CONTINUOUS PHASE MODULATION SYSTEM

FIELD

The present invention relates to a method and apparatus which uses data dependent pilot symbols in continuous phase modulation (CPM) systems for the transmission and detection of digital data in mobile radio applications to reduce the bit error rate of the CPM.

BACKGROUND

There are different types of interference that can lead to reduced detected signal strength of a transmitted signal at a receiver. Reflections or multiple sources which result in phase differences at the receiver can reduce the detected signal strength. Another type of interference which reduces detected signal strength is known as flat fading, in which the frequency response of the received signal is flat and only the gain and phase fluctuate.

The use of pilot symbol assisted modulation is a technique that has been applied for minimizing the effect of flat fading, and is particularly useful with mobile receivers. However, the use of pilot symbols for channel estimation has been confined to linear modulation schemes. It has been generally regarded that accurately estimating the phase of the received signal in a coherent detection of CPM signals is difficult and so little attention has been given to this problem. The difficulty arises because the transmitted CPM signal in any given interval depends not only on the current input symbols as well as the past input symbols. Thus, conventional pilot symbol techniques which are data independent and known channel estimation techniques can not be applied to CPM.

SUMMARY OF THE INVENTION

According to the invention there is provided an apparatus for transmitting and receiving digital information over mobile communication channels. The apparatus includes a pilot symbol insertion device for periodically inserting data dependent pilot symbols into frames of digital data for subsequent channel estimation, a continuous phase modulator for modulating and transmitting over a mobile communication channel the frames of digital data and means for receiving and filtering the transmitted data. A channel estimator estimates the channel amplitude and phase distortion from the received pilot signal at different time instants. Means are provided for demodulating the received signal and for decoding the demodulated signal to recover the estimated transmitted data.

Advantageously, there is provided a precoder employing a finite state precoding method whose operation is based upon a trellis structure substantially the same as the continuous phase modulation scheme.

The trellis structure may be that of a full response CPM scheme with an identical number of modulation levels and modulation index to that of the underlying CPM scheme.

The coherent detection technique for Continuous Phase Modulation (CPM) operating in the Rayleigh flat fading channel is based on the idea of inserting periodically data dependent pilot symbols that force the CPM signal to pass through known phase states. This transmission format enables the receiver to extract from the received signal the channel fading gains at regularly spaced instants. When coupled with proper channel estimation filters, very accurate channel state information (CSI) can be estimated at the receiver for fading compensation. Moreover, the accuracy of the CSI can be further refined by adopting a multiple-pass decoding approach.

BRIEF DESCRIPTION OF THE DRAWINGS

The novel features believed characteristic of the invention are set forth in the appended claims. The invention itself, however, as well as other features and advantages thereof, will be best understood by reference to the description which follows read in conjunction with the accompanying drawings wherein:

DETAILED DESCRIPTION WITH REFERENCE TO THE DRAWINGS

Figure 1:
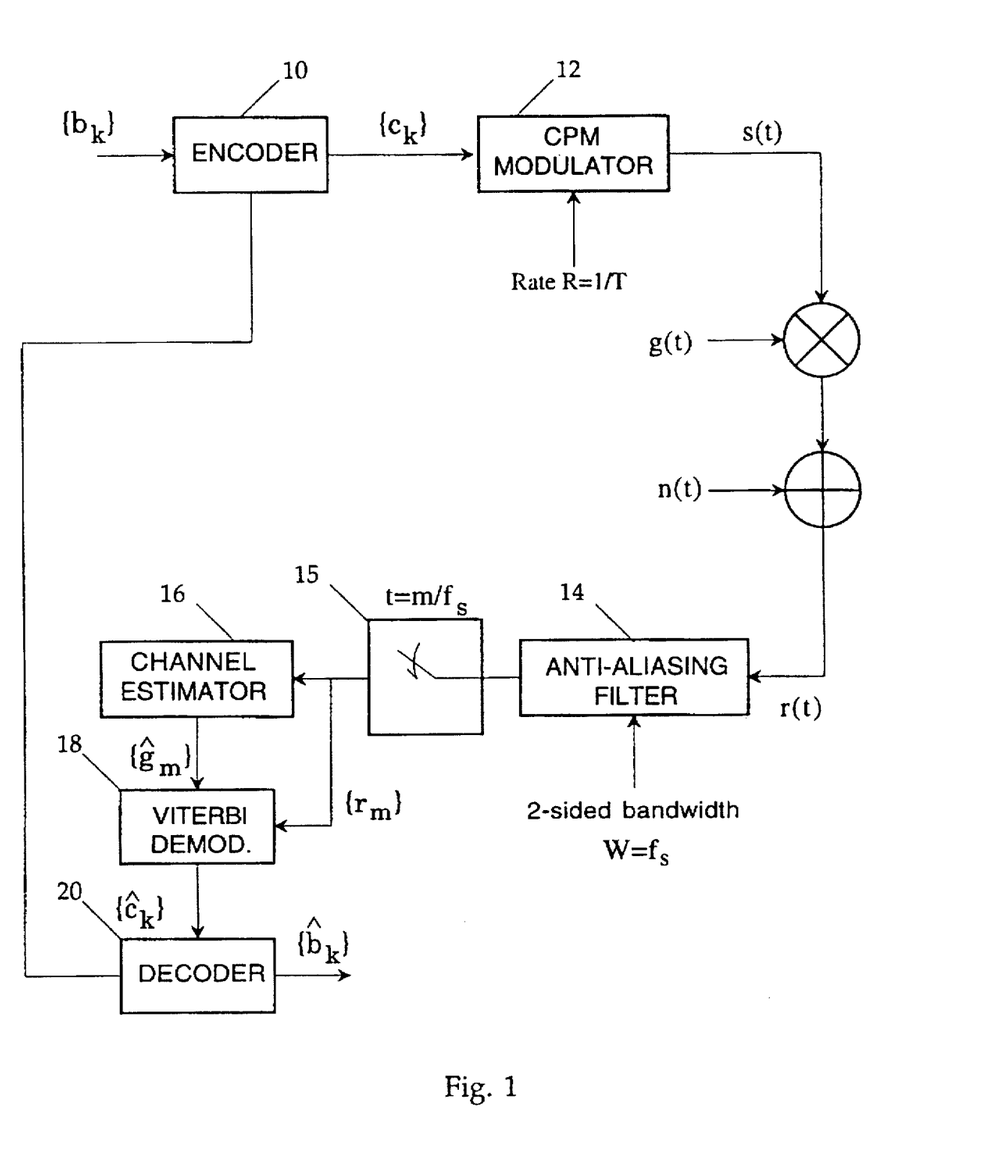
FIG. 1 is a block diagram of the CPM system.

The block diagram of the CPM system, shown in FIG. 1, includes an encoder 10 which receives the input data which is a sequence of binary Q-tuples $b=(\ldots, b_{-1}, b_0, b_1, \ldots)$, where $b_k=(b^1, b^2, \ldots, b^Q)$, $Q=\log_2 M$, $b^m \in \{0,1\}$, and M is the number of modulation levels. The encoder divides the sequence b into frames of K consecutive Q-tuples. Each frame is transformed by the encoder 10 into N channel symbols; N>K. The sequence of channel symbols is denoted by $c=(\ldots, c_{-1}, c_0, c_{-1}, \ldots)$, where each $c_k$ is chosen from the set $\{\pm 1, \pm 3, \ldots, \pm(M-1)\}$ with equal probability. Once all the data bits within the same frame have been precoded into channel symbol, pilot symbols are then added.

The channel symbols are output to a CPM Modulator 12. The CPM Modulator 12 carries out a modulation scheme which may have two or more levels. The resultant modulated signals s(t) are sent over a mobile radio channel with a Rayleigh flat fading model. The symbols g(t) and n(t) represent a zero mean complex Gaussian random process and represents flat fading and n(t) represents the channel's additive Gaussian noise. The transmitted signal is received by an ideal anti-aliasing filter 14 and the detected signal r(t) is filtered with a one-sided bandwidth of $f_s/2$ Hz. The filtered signal is sampled by a sampler 15 and fed to a channel estimator 16 and a Viterbi Demodulator 18. The channel estimator 16 estimates from r the channel fading process g(t). This channel state information (CSI) is then exploited by a Viterbi receiver 18 during the coherent demodulation of the CPM signal. The output of the Viterbi Demodulator 18 is sent to a decoder 20 which undoes the mapping done by the encoder 10.

Figure 2:
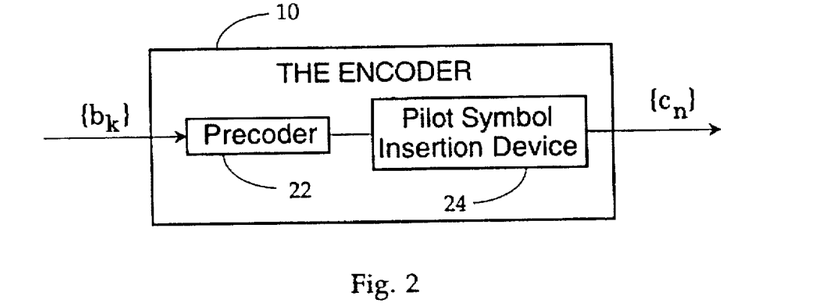
FIG. 2 is a block diagram of the encoder.

The structure of the encoder 10 is seen in FIG. 2 consists of a precoder 22 and a pilot symbol insertion device 24.

Figure 3:
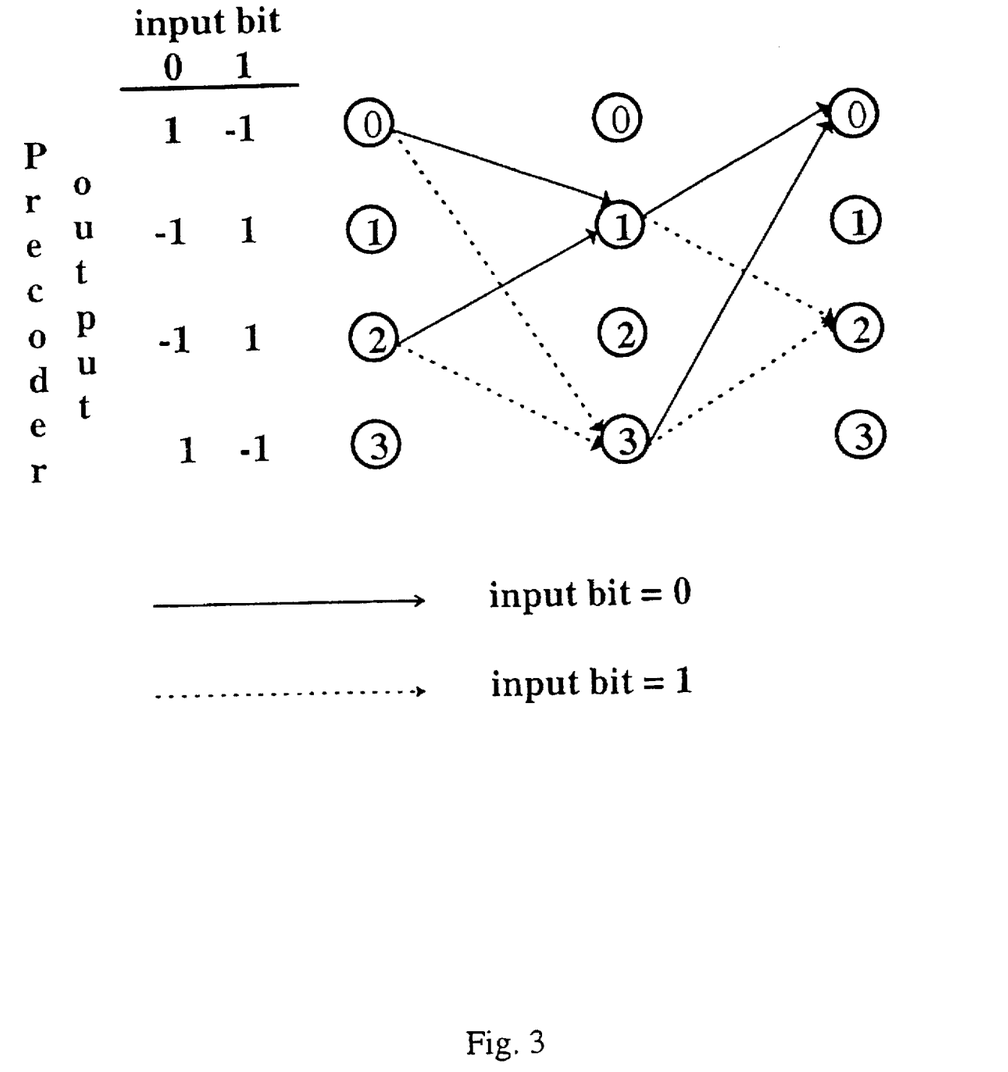
FIG. 3 is a trellis diagram of a binary precoder.
Figure 4:
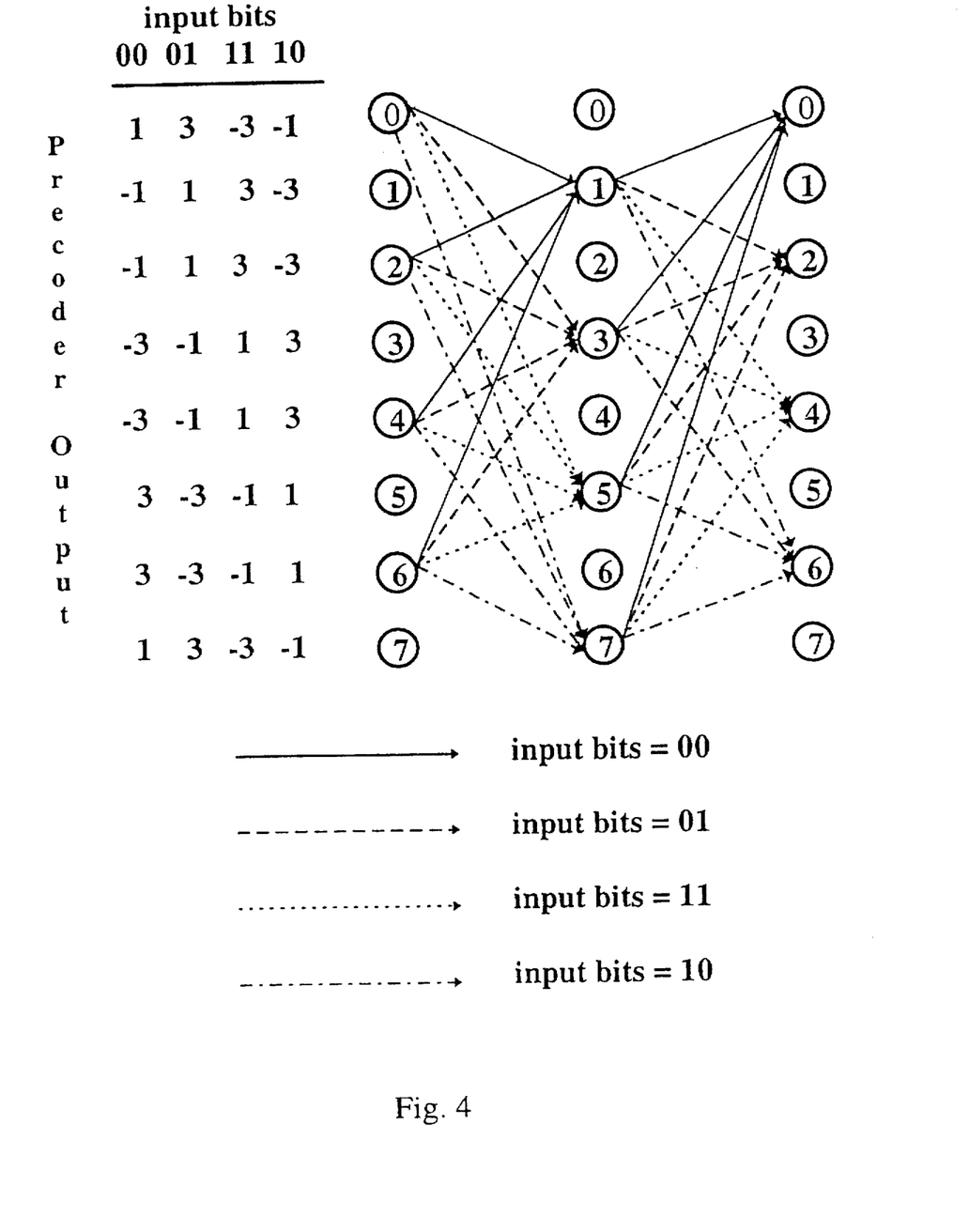
FIG. 4 is a trellis diagram of a 4-level precoder.
Figure 5:
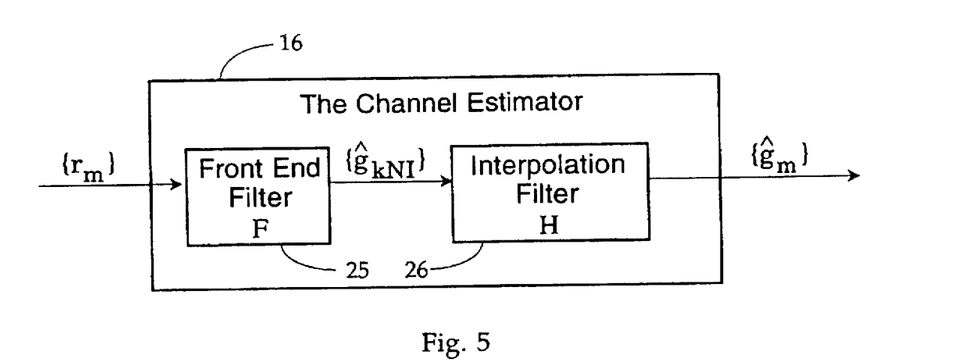
FIG. 5 is a block diagram of the channel estimator.

In conventional systems, a memoryless one-to-one mapper is used as the precoder. However, precoder 22 is a trellis precoder which reduces (relative to a memoryless mapper) the decoded bit error rate in M-level CPM systems with a rational modulation index of h=p/M. Examples of a binary, h=½, and a 4-level, h=¼ precoder trellis structure are shown in FIGS. 3 and 4, respectively. Referring to FIG. 3 if the initial precoder state is "0" on the top left and goes to a "1" state it produces a channel symbol of "1" as a result. The initial precoder state must be even. The next precoder state must be odd. If the next change is from the "1" state back to a "0" state then a "−1" channel symbol is generated. The two precoder structures are matched to error event characteristics of the underlying CPM schemes. In each case, the precoder 22 only introduces 1 bit of error to the most dominant error events. This is in contrast to the double errors introduced by a memoryless mapper. This factor of 2 reduction in the number of erroneous bits implies a potential 3 dB gain in power efficiency in Rayleigh fading channels with an inverse signal-to-noise ratio error characteristic.

Once all the data bits within the same frame have been precoded into channel symbols, pilot symbols are then added by pilot symbol insertion device 24. As in pilot symbol assisted linear modulations, the added symbols are required for accurate channel estimation. However because of the inherent memory in CPM, the pilot symbols being inserted are dependent on the input data. The rules for generating pilot symbols for M-level CPM schemes with a modulation index of 1/M are given later. The generalization of the encoding technique to h=p/M, where p is an integer and M the number of modulation levels, is also given later. It will be shown that all full response CPM schemes, as well as those partial response schemes using Nyquist-3 pulse shaping (but without correlative encoding), require only one pilot symbol per frame, i.e. N=K+1, where N is the number of channels and K is the number of consecutive Q-tuples per frame. For general partial response schemes such as generalized tamed frequency modulation (GTFM) and Gaussian Minimum Shift Keying (GMSK), more than one pilot symbol is required per frame.

Figure 6:
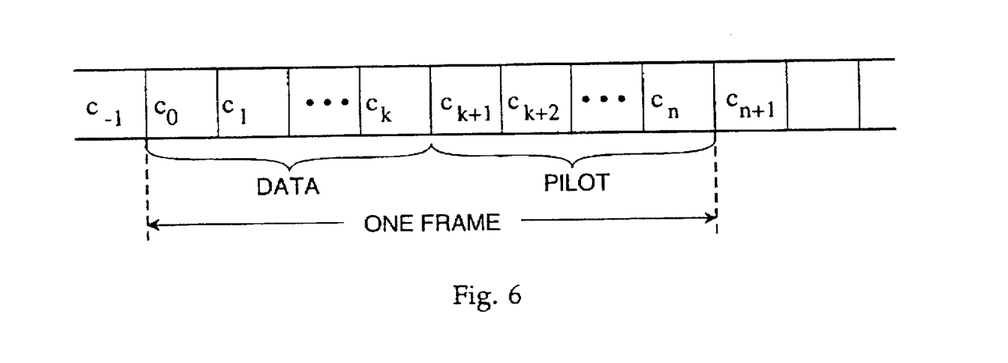
FIG. 6 is a schematic diagram of a frame showing the position of the pilot symbols.

The sequence $c=( \ldots, c_{-1}, c_0, c_{-1}, \ldots )$ of encoded channel symbols are fed to the modulator 12 at a rate of one symbol per T second in a frame as shown in FIG. 6 where $C_{N+1}$ and $C_N$ are Pilot Symbols. The phase trajectory of the resulting CPM signal in the interval $[(n-1)T, nT]$, where n is an integer, is given by $$\phi(t) = \phi_{n-1} + \pi h \sum_{k=0}^{L-1} c_{n-k} q_k(t - nT + T), \quad (1)$$

where $\phi_n$ is the value of $\phi(t)$ at time nT, h is the modulation index, and $q_k(t)$ is a waveform derived from the frequency pulse f(t) according to the following:

$$q_k(t) = \begin{cases} \int_0^t f(\tau + kT) d\tau & 0 < t < T \\ 0 & \text{otherwise} \end{cases} \quad (2)$$

It is assumed that f(t) is strictly time-limited to the interval [0, LT] and that its area is normalized to unity. This means:

$$\sum_{k=0}^{L-1} q_k(T) = \int_0^{LT} f(t) dt = 1 \quad (3)$$

In addition, only those f(t) values that are symmetrical about t=LT/2 are included. For these pulses, $$q_k(T) = q_{L-1-k}(T) \quad (4)$$

Note that pulse symmetry is very important in arriving at efficient pilot encoding rules.

The term $\phi_n$ in (1) can be expressed recursively according to the following equation:

$$\phi_n = \phi_{n-1} + \pi h \sum_{k=0}^{L-1} c_{n-k} q_k(T). \quad (5)$$

When taken modulo $2\pi$, $\phi_n$ becomes the phase state of the modulator 12 at time nT. The system state $S_n$ at the same time instant is obtained by combining the data state $(c_n, c_{n-1}, \ldots, c_{n-L+2})$ with the phase state, i.e.

$$S_n = (\phi_n, c_n, c_{n-1}, \ldots, c_{n-L+2}) \quad (6)$$

Implicit in the definition in (6) is that for full response CPM, the modulator state is the phase state. The collection of the system states and the corresponding state transitions from one time instant to the next forms the CPM trellis.

The transmitted CPM signal, in complex baseband notation, is $$s(t) = Ae^{j\phi(t)} \quad (7)$$

where A is the transmitted signal amplitude. This signal is sent over a mobile radio channel with a Rayleigh flat fading model. The corresponding received signal is $$r(t) = g(t)s(t) + n_w(t). \quad (8)$$

The term g(t) is a zero mean complex Gaussian random process and it represents flat fading. A commonly used autocorrelation function for g(t) is $$R_g(\tau) = \tfrac{1}{2} \overline{g^*(t)g(t+\tau)} = \sigma_g^2 J_0(2\pi f_D \tau) \quad (9)$$

where $\tau_g^2$ is the average power in the fading process, $f_D$ is the maximum Doppler frequency, $J_o(\cdot)$ is the zero-th order Bessel function, and ($\cdot$) represents a statistical average. While the above autocorrelation function is based upon a highly idealized scattering model, it is used for the purpose of developing analytical performance results. A properly truncated version of $R_g(\tau)$ will be used for generating simulation results. The function $n_w(t)$ is the channel's additive white Gaussian noise (AWGN). It is also a zero mean complex Gaussian process and has a power spectral density of $N_o$. The average symbol signal-to-noise ratio (SNR) is defined as $$\frac{E_s}{N_0} = 1/2 \int_0^T \frac{\overline{g(t)s(t)^2} dt}{N_0} = \frac{\sigma_g^2 A^2 T}{N_0} \quad (10)$$

Since each frame of QK data bits is encoded into N channel symbols, the bit signal-to-noise ratio, $E_b/N_o$, is defined as $N/QK\ E_s/N_o$.

Conceptually, we can assume that the received signal r(t) first passes through an ideal anti-aliasing filter with a one-sided bandwidth of $f_s/2$ Hz. The filtered signal is sampled at a rate of $f_s = 1/T_s$ Hz. It is assumed that the sampling frequency is I times the baud rate, i.e. $f_s = I/T$, where I is an integer. In the absence of adjacent channel interference (ACI), the sampling rate can, in theory, be as large as possible. Consequently the intersymbol interference (ISI) generated from the anti-aliasing filter can be ignored. In the presence of ACI, the sampling rate $f_s$ must be chosen so that the total ISI and ACI is minimized.

The output samples of the anti-aliasing filter is denoted by $r=(\ldots, r_{-1}, r_0, r_1, \ldots)$, where $$r_i = g_i s_i + n_i \qquad (11)$$

$g_i$ is the value of the fading process g(t) at time $t=iT_s$, $s_i$ is the transmitted signal s(t) evaluated at the same time instant, and $n_i$ is a sample of the filtered Gaussian noise. The different $n_i$'s are statistically independent and identically distributed (iid), each having a zero mean and a variance of $\sigma2=f_s N_o$. The sequence r is passed to the channel estimator 16 shown in more detail in FIG. 3. The latter consists of both a front end filter 25 and an interpolation filter 26. The function of the channel estimator 16 is to estimate from r the channel fading process g(t). This channel state information (CSI) is then exploited by a receiver of the Viterbi demodulator 18 during the coherent demodulation of the CPM signal. The channel estimator 16 and the Viterbi demodulator 18 are discussed in more detail later.

The Precoder

The output of the Viterbi demodulator 16 in FIG. 1 be denoted by $\hat{c}_k$. Like the transmitted symbol $c_k$, each detected symbol $\hat{c}_k$ takes on a value from the set $\{\pm 1, \pm 3, \ldots \pm(M-1)\}$. These symbols are fed to the decoder 20 that undoes the mapping performed by the precoder 22.

For binary CPM schemes with a modulation index of h=½, an error event in the Viterbi demodulator 16 can always be described in the form $$\Gamma=(\gamma_1, \gamma_2, \ldots)=(+2,0,0, \ldots, 0,0,+2,0,0, \ldots) \qquad (12)$$

where $\gamma_k = c_k - \hat{c}_k$ is called a difference symbol, and without loss of generality we assume $\gamma_1$ is positive. Note that for an error event of length l in the demodulation trellis, there are altogether $l-l_{min}$ number of "0" symbols in between the difference symbols "+2" and "±2", where $l_{min}$ is the length of the shortest error events. This error event structure depicted by (12) means that when a one-to-one memoryless mapper is used to encode the actual data into channel symbols, the binary CPM demodulator always introduces 2 bit of errors to an error event, independent of its length. However, if the precoder 22 in FIG. 2 is used instead, there will be one bit of error in the initial split, no error in the final remerge, and 1 bit of error for each of the "0" symbols in between the difference symbols "+2" and "±2". Since the performance of a CPM scheme is dominated by the shortest error events, this means the precoder in FIG. 2b can provide up to 3 dB of coding gain in fading channels.

The structure of the error events for M-level CPM schemes can be found in equation. 3 of [2]. In the case of M=4 and h=¼, the shortest and the most dominant error events are of the form $\Gamma=(+2,-2,0,\ldots)$, or $\Gamma=(+6,-6,0,\ldots)$, or $\Gamma=(+6,+2,0,\ldots)$. Without loss of generality, it is assumed $\gamma_1$ is positive. With the precoder shown in FIG. 2, each of these error events causes only one bit of error, which is half that introduced by a memoryless Gray mapper. Similarly, for all the remaining shortest error events, which are of the form $\Gamma=(+4,\pm4,0,\ldots)$, the precoder 22 in FIG. 2 introduces 2 bits of error while a Gray mapper introduces 4 bits of error. Thus once again, it can be concluded that precoding can substantially reduce the bit error rate of the system.

The design of the 2 precoders mentioned above is based on the observation that the trellis diagram of a full response CPM scheme with h=1/M is identical to that of π/M—MPSK. Specifically, there are 2M states, labelled "0" to "2M−1". The modulator 12 can change state from any of the even states to any of the odd states, and vice versa. Consequently, there are always M transitions emanating from and merging into each state. In the transition from state "j" at time (n−1)T to state "i" at time nT, the channel symbol $c_n$ satisfies:

$$c_n = \begin{array}{ll} \Delta & -M < \Delta < M \\ \Delta - 2M & M < \Delta < 2M \\ \Delta + 2M & -2M < \Delta < M \end{array} \qquad (13)$$

where $\Delta=i-j$ is always an odd number in the range [−2M, 2M]. Note that transitions emanating from any given state receive all the symbols from the signal alphabet $\{\pm 1, \pm 3, \ldots \pm(M-1)\}$. The same is true for the transitions joining at any given state.

Now, if for the precoder the same trellis structure (see FIGS. 3 and 4) and the same encoding rule (13) is used as for the modulator 12, then the design of the precoder 22 is equivalent to finding the optimal state dependent assignments of input binary data to the transitions in the modulation trellis that minimizes the decoded bit error rate. In this study, we adopt the heuristic rules that (1) all the transitions joining at any given state have the same input binary pattern, and (2) Gray mapping is used to assign input binary patterns to all the transitions diverging from any given state. These rules guarantee that the most dominant error events always receive only one bit of error, as oppose to the 2 bit of errors found in a Gray mapper. However, it should be pointed out that the precoders 22 in FIG. 2 actually introduce more errors to longer error events than the memoryless mappers. Fortunately, these longer error events occur much less frequent. Consequently, the precoders in FIG. 2 are able to provide a net performance improvement.

Finally, it should be pointed out that the precoding rule given by (13) is only valid for h=1/M. For h=p/M, where p is an integer, a different precoding rule can be derived (once again) from the CPM trellis. Although the precoders discussed are derived from the trellises of full response CPM schemes, they can be applied equally well in partial response systems. This stems from the fact that both full and partial response CPM schemes have identical error event structures.

The Pilot Symbol Encoding Rules

As shown previously, the output of the CPM modulator 12 in any interval depends not only on the current channel symbol, but also on the phase state as well as the previous channel symbols. Because of this memory effect, the pilot symbol encoding rule used in linear modulations can no longer be directly applied to CPM. The following are data dependent pilot encoding rules for M-level CPM schemes with h=1/M. These rules guarantee that the modulator can be forced to return periodically to a known phase state. The generalization of the proposed pilot symbol encoding technique to h=p/M, p an integer, is given later. For convenience, the zero phase state is chosen as the one which the modulator 12 is forced to return to periodically. For some applications it would be desirable to randomize these known states so that the modulated signal will not contain any spectral lines.

Full Response Signalling

Considering first the case of full response signalling in which the pulse length, L, equals unity. Assuming an initial phase state of $\phi_0=0$, then repeated use of (5) enables us to write $\phi_n$ as $$\phi_n = \pi h \sum_{k=1}^{n} c_k \bmod 2\pi \qquad (14)$$

If $h=1/M$ and $n$ is odd, then $\phi_n$ must be of the form:

$$\phi_n = \frac{m}{M} \pi \bmod 2\pi; \ m \in \{\pm 1, \pm 3, \ldots, \pm(M-1)\}, \qquad (15)$$

where the convention that all the phase states are defined over the interval of $[-\pi, \pi]$ is adopted. In this case, one can force $\phi_{n+1}$ to zero by using a pilot symbol $c_{n+1}=-m$, which is a valid channel symbol. On the other hand if $h \neq 1/M$, it can be shown that one cannot, in general, force $\phi_{n+1}$ to zero in one-step by using a valid channel symbol from the set $\{\pm 1, \pm 3, \ldots, \pm(M-1)\}$. If the restriction that the pilot symbols must be chosen from the same signal set as the data symbols is removed, then the idea of data dependent pilot symbols can be extended easily to other modulation indices. It is also possible to use a longer pilot block, rather than a different set of channel symbols, to force the modulator to return periodically to the zero phase state. An illustrative example of the two alternatives is given later for the case of binary full response CPM with a modulation index of $h=\frac{3}{4}$. Also shown later is the proof that the proposed pilot symbol encoding technique can be generalized to all rational modulation indices of the form $h=p/M$. It should be pointed out that the "optimal" precoders for different integer $p$ will have, in general, different assignments of channel symbols to their transitions (but the basic trellis structure remains the same).

Thus, a pilot symbol assisted M-level full response CPM schemes with $h=1/M$ uses an even transmission frame size $N$ with one data dependent pilot symbol per frame. The pilot symbol insertion rule is given by $$c_{kN} = -m \ \text{if} \ \phi_{kN-1} = \frac{m}{M} \pi \bmod 2\pi \qquad (16)$$

where $c_{kN}$ is the pilot symbol of the k-th frame. Since this rule guarantees that $\phi_{kN}=0$ for any integer $k$, the output of the anti-aliasing filter at time $kNT$ becomes $$r_{kNT} = A g_{kNT} + n_{kNT}, \qquad (17)$$

which is independent of any channel symbols. With appropriate suppression of the noise terms $n_{kNT}$ by the channel estimator, these periodic pilot samples can provide accurate channel state information.

Partial Response Signalling

The idea of data dependent pilot symbols can be generalized to partial response CPM schemes with an arbitrary pulse length L. For illustration purpose, consider the case when $L=3$ and $h=1/M$. As in the case of full response signalling, the pilot symbol encoding technique reported in this section can be generalized to rational modulation indices of the form $h=p/M$.

By setting the term $\phi_o$ to zero, equation (5) can be written as $$\phi_n \phi_{n-2} + \pi h \{ \{q_0(T) + q_1(T)\} c_{n-1} + q_0(T) c_n \} \bmod 2\pi, \qquad (18)$$

where $$\theta_{n-2} = \pi h \left[ q_2(T) c_{-1} + \{q_1(T) + q_2(T)\} c_0 + \sum_{k=1}^{n-1} c_k \right], \qquad (19)$$

and the $q_k(t)$'s were defined in (2)–(4). Given that $q_0(T)=q_2(T)$ and that $q_0(T)+q_1(T)+q_2(T)=1$, the term $\theta_{n-2}$ can be made independent of the pulse shape if we set $c_{-1}=c_0$. In this case, $\theta_{n-2}$ equal to $m\pi/M$ modulo $2\pi$ when n is even, where m is an integer from the set $\{\pm 1, \pm 3, \ldots, \pm(M-1)\}$. This means one can force $\phi_n$ to zero by choosing $c_{n-1}=c_n=-m$. The above observation suggests that a pilot symbol assisted partial response CPM scheme with $L=3$ and $h=1/M$ would use an even frame size $N$, with each frame consists of $K=N-2$ information symbols and 2 data dependent pilot symbols. The pilot symbol encoding rule is given by $$c_{kN-1} = c_{kN} = -m \ \text{if} \ \theta_{kN-2} = +m\pi/M \bmod 2\pi, \qquad (20)$$

where $c_{kN-1}$ and $c_{kN}$ are the pilot symbols in the k-th frame. As in the case of full response signalling, the received sample at time $kNT$ is given by (17) and is independent of the channel symbols.

The general pilot symbol encoding rules for even and odd pulse lengths L are given in Table 1 below.

TABLE I

Pilot Symbol Encoding Rules.

| pulse length L | frame size N | $\Omega$ | possible values of $\Omega$ | pilot symbols | pilot encoding rules |
|---|---|---|---|---|---|
| 2l | even or odd | $\left[ c_{-l+1} + 2 \sum_{n=-l+2}^{kN-l-1} c_n \right]$ mod 4M | $\{\pm 1, \pm 3, \ldots, \pm(2M-1)\}$ | $c_{kN-l}, \ldots, c_{kN}$ | $c_{kN-l+1} + 2c_{kN-l} = -\Omega$ $c_{kN-i} = c_{kN-l+1+i}$ where, $i = 0, 1, \ldots, l-2$ |
| 2l+1 | even | $\left[ \sum_{n=-l+1}^{kN-l-1} c_n \right]$ mod 2M | $\{\pm 1, \pm 3, \ldots, \pm(M-1)\}$ | $c_{kN-l}, \ldots, c_{kN}$ | $c_{kN-l} = -\Omega$ $c_{kN-i} = c_{kN-l+2+i}$ where, $i = 0, 1, \ldots, l-1$ |

Following a similar convention used to define the phase states, the result of a modulo 2M (or a modulo 4M) operation in Table 1 can take on a negative value. As in the case of $L=3$, the rules listed in Table 1 are obtained by exploiting the symmetry in the pulse shape f(t). It was found that in general, the number of pilot symbols required per frame equal $$N_p = N - K = \begin{cases} 1 + L/2 & L \text{ even} \\ 1 + \frac{L-1}{2} & L \text{ odd} \end{cases} \qquad (21)$$

Compared to full response signalling, pilot symbol assisted partial response schemes require more pilot symbols. Fortunately, most of the CPM schemes of practical interest have a pulse length shorter than 6 symbol intervals. This means each frame will consist of at most 3 pilot symbols, which for a reasonable fade rate $f_dT$, does not significantly affect the throughput of the modem.

Nyquist-3 Frequency Modulation—N3FM

For the class of partial response CPM schemes using a Nyquist-3 frequency pulse the term $q_k(t)$ in (2) satisfies the criterion:

$$q_k(T) = \begin{cases} 1 & k = \frac{L-1}{2} \\ 0 & \text{otherwise} \end{cases} \quad (22)$$

where it is assumed that the pulse length L is an odd integer. Consequently, the term $\phi_n$ in (5) becomes $$\phi_n = \phi_{n-1} + \pi h c_{n-\delta} = \pi h \left[ \sum_{k=1-\delta}^{n-\delta} c_k \right], \quad (23)$$

where $\delta = \frac{L-1}{2}$.

Except for a time shift, the above equation is identical to the one derived earlier for full response CPM; see Equation 14. In other words, all N3FM schemes require only one pilot symbol per frame.

The Channel Estimator and Demodulator

The received samples in Equation 11 are passed to the channel estimator. The estimator consists of a front end filter F and an interpolation filter H (see FIG. 3). The function of the front end filter is to suppress as much as possible the wideband noise in the received pilot samples in Equation 17. These filtered pilot samples are then interpolated to obtain fading gain estimates at other instants.

The Optimal Front End Filter

Without loss of generality, consider only the estimation of the fading gain at time t=0, i.e. $g_0$. The estimated value is denoted by $\hat{g}_0$ and the estimation error is $e = g_0 - \hat{g}_0$. Note that the estimation error e is also complex Gaussian.

In principle, one can estimate $g_0$ directly from the received pilot sample $r_0$. This results in a mean squared estimation error equal to the variance of the noise sample $n_0$. As mentioned earlier, the noise variance equals $f_sN_o$, where $f_s = 1/T$ is the two-sided bandwidth of the anti-aliasing filter. In order to suppress the intersymbol interference generated from the filtering operation, it is required that I be a large number. This translates into an unnecessary large mean squared error (MSE) if $g_o$ is estimated directly from $r_0$.

To reduce the MSE in the fading gain estimates to below $f_sN_o$, a front end filter should be used to determine $g_0$ from the block of received samples $$R = (r_{-\alpha I}, \ldots, r_0, r_1, \ldots, r_{\alpha I})^t, \quad (25)$$

where $2\alpha$ is the span of the filter given in number of symbol intervals, and $(\cdot)^t$ represents the transpose of a matrix. Specifically $$\hat{g}_0 = FR \quad (26)$$

From linear estimation theory, the optimal filter F, in the minimum MSE sense, is given by $$F_{opt} = \Phi_{gR}\Phi_{RR}^{-1} \quad (27)$$

where $\Phi_{gR} = (\frac{1}{2})g_0R^+$ is the correlation between $g_0$ and R and $\Phi_{RR} = (\frac{1}{2})RR^+$ is the covariance matrix of R. Note that the notation $(\cdot)^+$ is used to represent the Hermitian transpose of a matrix.

Although the received sample $r_0$ is independent of any data symbol, other elements in R are not. Let the length of the frequency pulse f(t) be written in the form L=2k+j, where j=0 when L is even and j=1 when L is odd. Also let $(s_{-\alpha I}, \ldots, s_0, s_1, \ldots, s_{\alpha I})$ be the i-th legal waveform of length $2\alpha$ symbols (including pilot symbols) that passes through the zero phase state at time t=0. Based on the pilot symbol encoding rules listed in Table I, it can be shown that when $\alpha$ is less than L, then there are altogether $J=M^{\alpha+k}$ such waveforms and they have the common characteristic that $s_o^{(i)}=A$. When $\alpha$ is greater than L−1, then the number of such waveforms will be increased by a factor of $M^{\alpha-L+1}$. Let the diagonal matrix $S_i$ be defined as:

$$S_i = \text{diag}(s_{-\alpha I}, \ldots, s_{\alpha I}), \quad (28)$$

where i=0,1,...,J−1. Then it can be shown that $$\Phi_{gR} = (1/J) \sum_{i=0}^{J-1} S_i^+ \quad (29)$$

and $$\Phi_{RR} = (1/J) \sum_{i=0}^{J-1} S_i(\Phi_{GG} + \Phi_{nn}) S_i^+ \quad (30)$$

Note that $\Phi_{GG}$ is the covariance matrix of the column vector $G = (g_{-\alpha I}, \ldots, g_{\alpha I})^t$ of complex gain terms. $\Phi_{nn} = f_sN_oI$ is the covariance matrix of the noise vector $n = (n_{-\alpha I}, \ldots, n_{\alpha I})^t$, I is an identity matrix of size $2\alpha I+1$, and $\Phi_{gG}$ is the correlation of $g_0$ and G. The components of the $\Phi_{GG}$ and $\Phi_{gG}$ matrices can be determined easily from the autocorrelation function of the fading process in Equation 9. Given the optimal front end filter in Equations 27–30, the mean squared estimation error is $$\epsilon^2 = \frac{1}{2}\overline{|g_o - \hat{g}_o|^2} = \sigma_g^2 - \Phi_{gR}\Phi_{RR}^{-1}\Phi_{Rg} \quad (31)$$

where $\Phi_{Rg}$ is the Hermitian transpose of $\Phi_{gR}$. The value of the MSE is used to design the interpolation filter.

Consider the ideal case when the receiver has perfect knowledge about the pilot and data symbols at the frame boundary. In this particular case, the front end filter is given by $$F_o = \Phi_{gG}(\Phi_{GG} + \Phi_{nn})^{-1}S_o^+ \quad (32)$$

where $S_o$ is the diagonal matrix constructed from the pilot and the data symbols at the frame boundary. The mean squared estimation error of this front end filter is $$\epsilon_o^2 = \sigma_g^2 - \Phi_{gG}(\Phi_{GG} + \Phi_{nn})^{-1}\Phi_{Gg} \quad (33)$$

which is independent of $S_o$. Of course one expects that $\epsilon^2_o$ is less than the original MSE $\epsilon^2$ in (31). To enjoy this potential reduction in MSE (and hence a reduction in bit error rate) in practice, one can adopt an iterative decoding approach (i.e. decision feedback, or multiple-pass) whereby $S_o$ is replaced by the corresponding decision from the previous decoding attempt.

The Interpolation Filter

The output of the front end filter at time kNT, k an integer, can be written as $$y_k = x_k + e_k \quad (34)$$

where $$x_k = g_{kNI} \quad (35)$$

and $$e_k = g_{kNT} - \hat{g}_{kNT}. \quad (36)$$

is the estimation error of the front end filter. The $e_k$'s are iid zero mean complex Gaussian random variables with a variance of $\epsilon^2$ (31). The $y_k$'s are fed to the interpolation filter for the estimation of the fading process at other instants. For reliable estimation, the frame size N must be chosen to satisfy the Nyquist sampling theorem. This means for a Doppler frequency of $f_D$, $2Nf_DT$ must be less than 1. In this study, N is chosen to be approximately $1/(3f_DT)$. Without loss of generality, one only considers the frame that starts at time zero and ends at time NT.

Let the column vectors X, Y, and e equal $(x_{1-\beta}, x_{2-\beta}, \ldots, x_\beta)^t$, $(y_{1-\beta}, y_{2-\beta}, \ldots, y_\beta)^t$, and, $(e_{1-\beta}, e_{2-\beta}, \ldots, e_\beta)^t$ respectively, where $2\beta$ is the size of the interpolator. To estimate any fading gain sample $g_n$, $1 \leq n \leq NI-1$, from the vector Y, the estimator computes $$\hat{g}_n = H^{(n)} Y \quad (37)$$

where the optimal interpolation filter is given by $$H^{(n)} = \Phi^{(n)}_{gX}(\Phi_{XX} + \epsilon^2 I)^{-1}, \quad (38)$$

Here $\Phi_{XX}$ is the covariance matrix of the gain vector X, $\epsilon^2 I$ is the covariance matrix of e, $\Phi_{XX} + \epsilon^2 I$ is the covariance matrix of Y, and $\Phi^{(n)}_{gX}$ is the correlation of $g_n$ and X. The corresponding mean squared interpolation error is $$\mu_n^2 = \sigma_g^2 - \Phi^{(n)}_{gx}(\phi_{xx} + \epsilon^2 I)^{-1} \Phi_{xg}(n) \quad (39)$$

where $\Phi(n)_{Xg}$ is the Hermitian transpose of $\Phi(n)_{gX}$. Note that in the ideal case when the front end filter has side information about the data and pilot symbols at each frame boundary, the term $\epsilon^2$ in both (38) and (39) should be replaced by $\epsilon^2_o$ from (33). Finally, we like to point out that the interpolation error $\mu^2_n$ is rather insensitive to the data position n.

The Viterbi Demodulator

The sequence of channel estimates $\{\hat{g}_n\}$ are fed to a coherent CPM demodulator implemented in the form of the Viterbi algorithm (VA). The VA selects the sampled waveform $\hat{s} = (\ldots, \hat{s}_{-1}, \hat{s}_0, \hat{s}_1, \ldots)$ in the CPM trellis that maximizes the conditional probability density function of the received samples $\{r_n\}$ given $\hat{s}$ and $\{\hat{g}_n\}$. Since the received samples are Gaussian and that the CPM signal has a constant envelope, this is equivalent to selecting the waveform whose metric $$M(\hat{s}) = \sum_m \{r^*_m \hat{g}_m \hat{s}_m + r_m \hat{g}^*_m \hat{s}^*_m\} \quad (40)$$

is the largest.

It was shown in above that the MSE (mean square error) of the estimator can be significantly reduced if it has side information about the pilot and data symbols at the frame boundaries. This suggests an iterative decoding approach in which the decisions of the Viterbi demodulator are fed back to the channel estimator for the purpose of constructing better fading gain estimates in the next decoding attempt. Although some of the fed back information may be erroneous, it is believed that as long as the initial bit-error-rate (BER) is relatively low, the impact of erroneous decision feedback is minimal. As an example, the error performance of a 1-pass (i.e. no decision feedback), a two-pass, and a 3-pass decoder will be compared.

Despite the occasional erroneous decision feedback, the interpolator used in the second pass (and up) of a multiple-pass decoder is obtained by replacing the term $\epsilon^2$ in (38) by the term $\epsilon^2_o$ from (33).

Numerical Results

Figure 7:
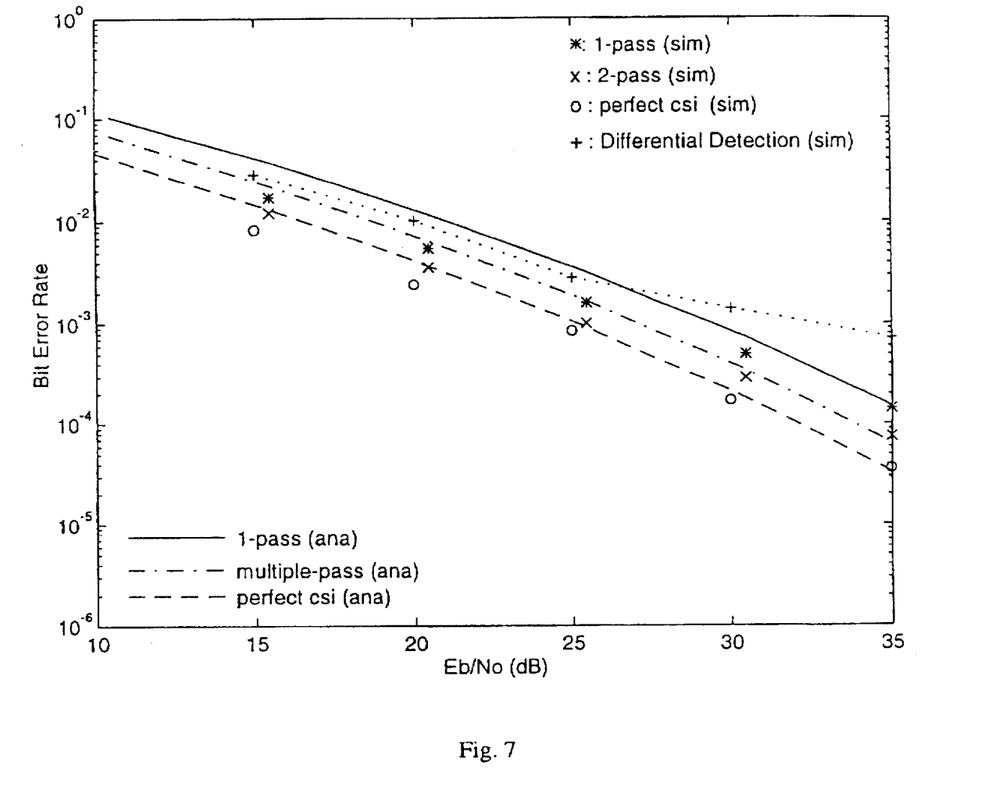
FIG. 7 is a graph showing the analytical and simulation bit error rate results for Minimum Shift Keying (MSK) at a normalized fade rate of 0.01 with precoding.
Figure 8:
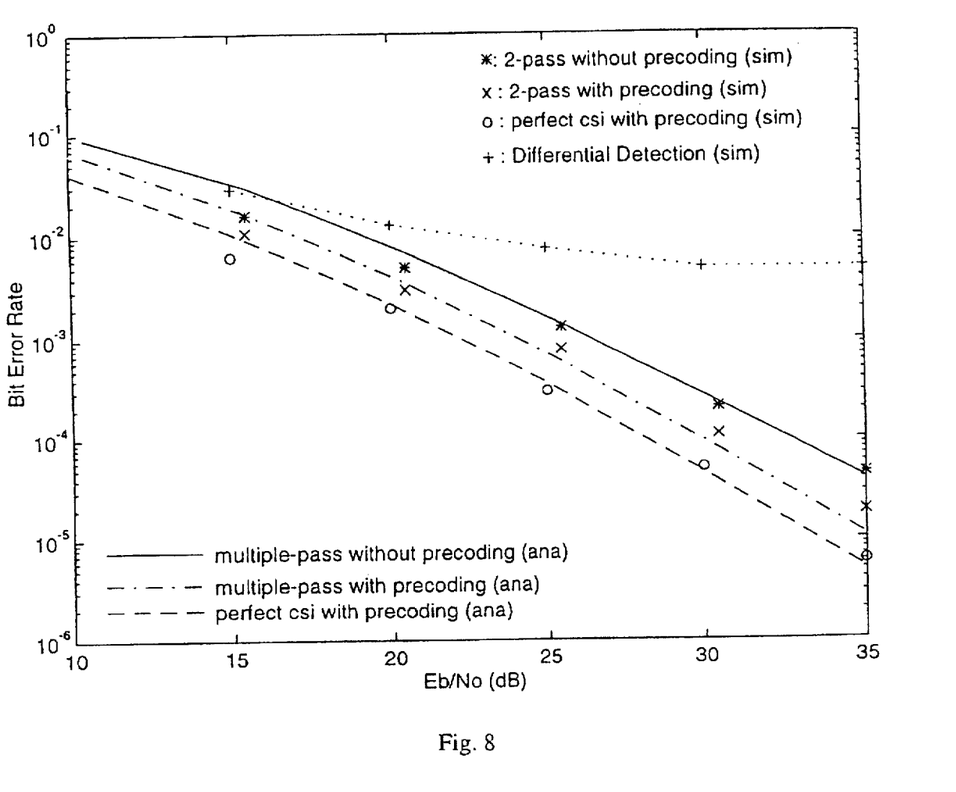
FIG. 8 is a graph showing the analytical and simulation bit error rate results for Minimum Shift Keying (MSK) at a normalized fade rate of 0.03 with precoding.

In FIGS. 7 and 8 the analytical and simulation results for MSK at normalized fade rates, $f_DT$, of 0.01 and 0.03 respectively, are shown. Also included in these figures are the performance curves of MSK with perfect channel state information (CSI) and with differential detection. In the latter case, the optimal front end filter derived previously is used as the pre-detection filter. For $f_DT=0.01$, the frame size is N=30 whereas for $f_DT=0.03$ the frame size is N=10. The span of the prefilter is 2 symbol (or $\alpha=1$) and the size of the interpolator is 10 (or $\beta=5$). The analytical results are obtained by summing the shortest ($l_{min}=2$) and the next shortest error events. The simulations were performed with I=8 samples per symbol.

There are several interesting observations: (a) As oppose to differential detection, no irreducible error floor is observed at the output of our pilot symbol aided detector. To the contrary, even though there is no interleaving, the MSK error curve exhibits a diversity effect in fast fading channels. This can be seen from FIG. 7 where the bit error probability decreases at a rate faster than the inverse signal-to-noise-ratio.

(b) As shown in FIG. 7, at a BER of $10^{-3}$ and a $f_DT=0.01$, the 2-pass decoder provides a 2.5 dB improvement in SNR when compared to its one-pass counterpart.

(c) At a BER of $10^{-3}$ and a fade rate of $f_DT=0.03$, the precoder 22 having the trellis structure shown in FIG. 3 provides a 1.8 dB coding gain relative to a memoryless mapper; see FIG. 8.

Figure 9:
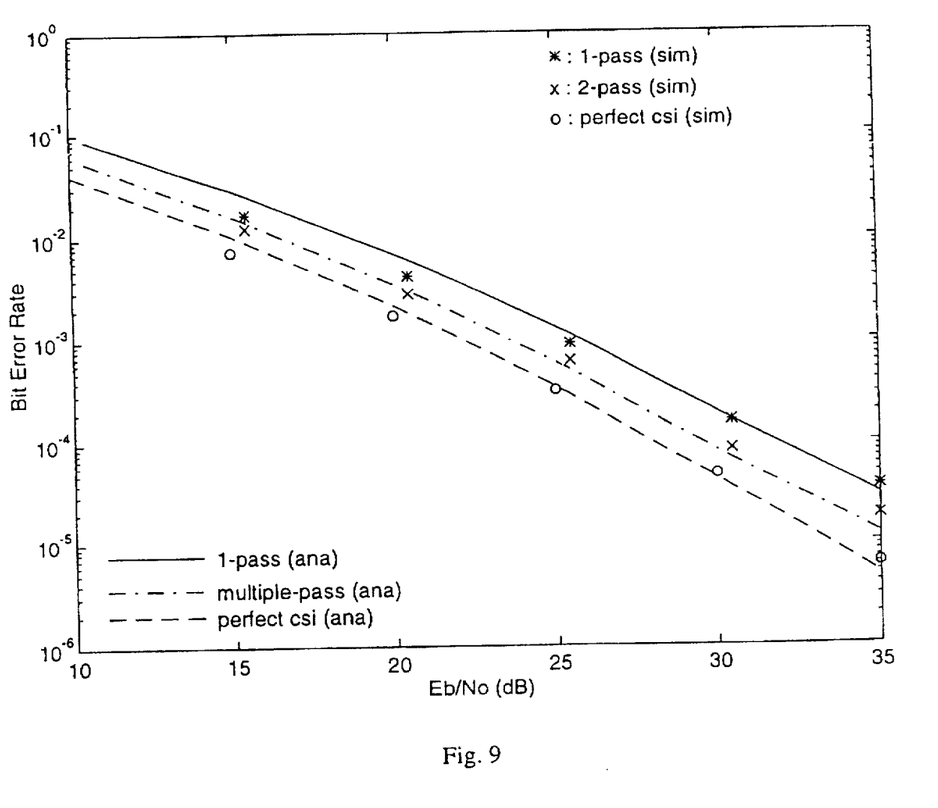
FIG. 9 is a graph showing the analytical and simulation bit error rate results for Gaussian Minimum Shift Keying (GMSK) at a normalized fade rate of 0.01 with precoding.
Figure 10:
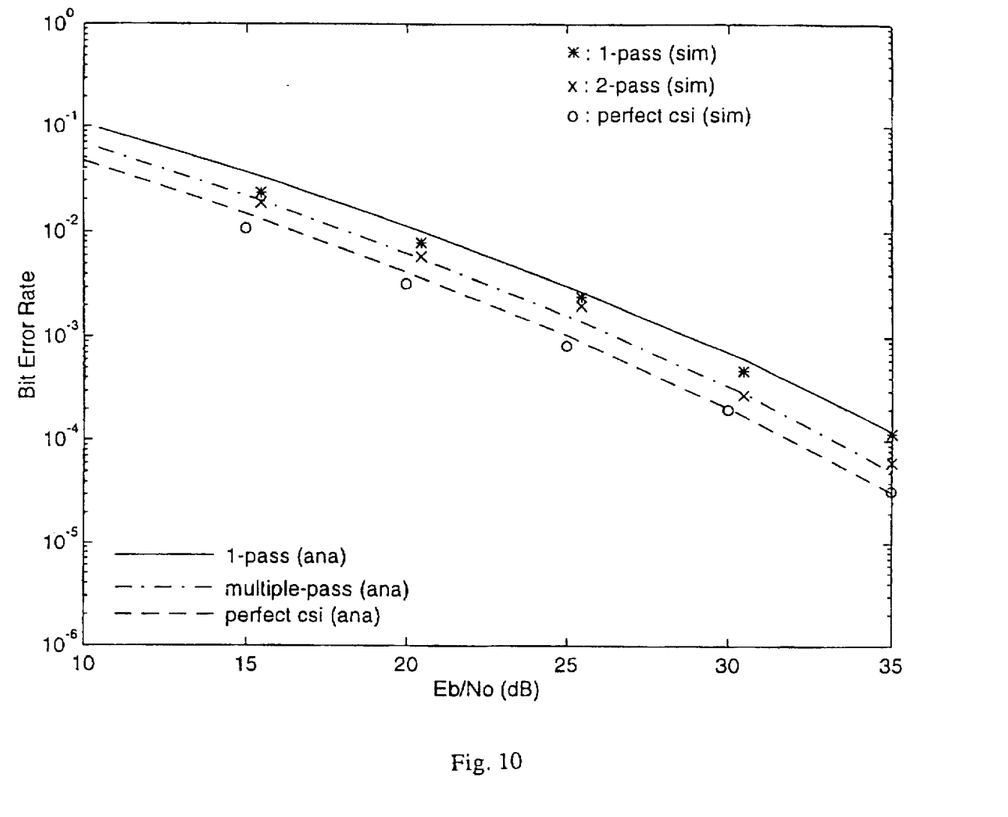
FIG. 10 is a graph showing the analytical and simulation bit error rate results for Gaussian Minimum Shift Keying (GMSK) at a normalized fade rate of 0.03 with precoding.

The results for GMSK with BT=0.4 [3] are shown in FIGS. 9 and 10. The frequency pulse f(t) is truncated to L=3 intervals. The frame size and interpolator size are identical to those used in MSK. However, the span of the prefilter is increased to 4 symbol (i.e. $\alpha=2$). The observations are similar to those in MSK. In comparing the two sets of results, we found that GMSK has almost identical performance to MSK in terms of the BER. Although not shown, the precoder 22 having the structure shown in FIG. 3 provides a coding gain of 1.7 dB when compared to a memoryless mapper. Similar results on GTFM can be found.

Figure 11:
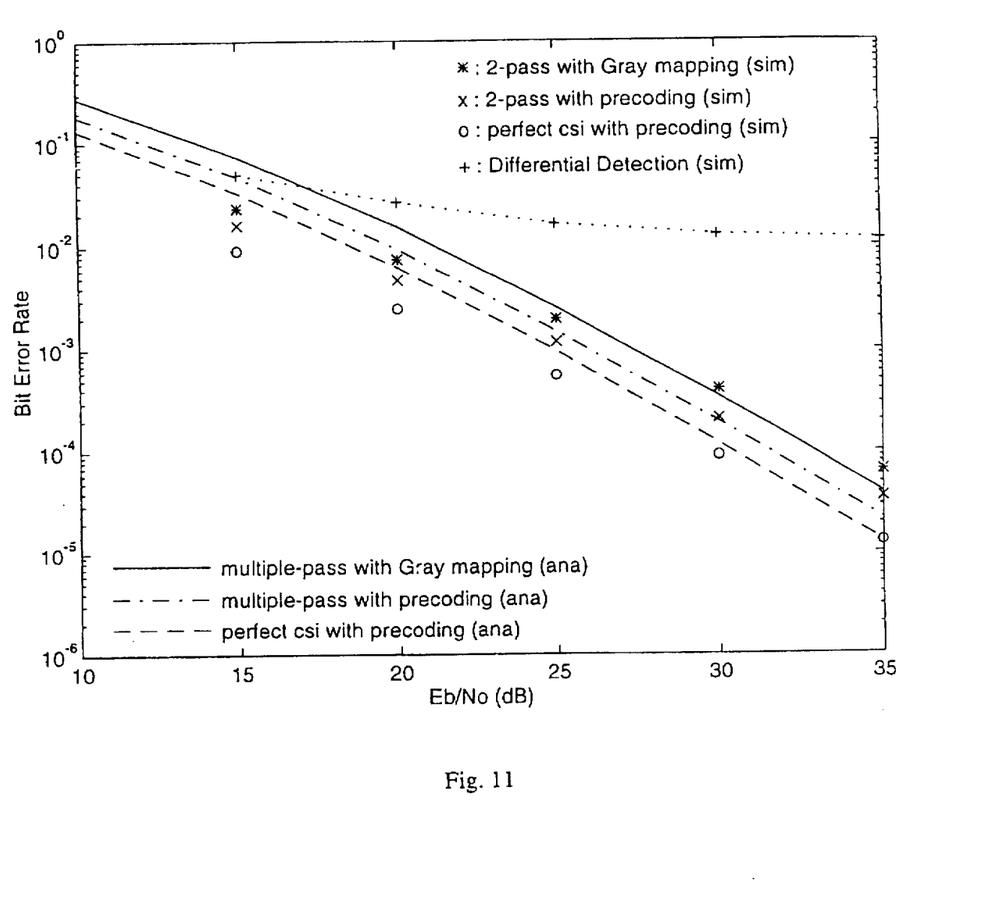
FIG. 11 is a graph showing the effect of precoding in 4 level Continuous Phase Frequency Shift Keying (4 CPFSK).

Finally, in FIG. 11 there is presented the effect of precoding in a 4-level Continuous Phase Frequency Shift Keying (4CPFSK) system with a modulation index of h=¼ and a 2-pass decoder. The precoder 22 being used is the one having the trellis structure shown in FIG. 4. In the absence of precoding, a Gray mapper was used instead. The frame size, the interpolator size, as well as the span of the front end filter are identical to those used in MSK. Also shown in FIG. 11 is the performance curve of a differential detector with a pre-detection filter given by Equation 27. As in the case of MSK (see FIG. 7), there is no irreducible error floor and precoding provides about 1.7 dB improvement in SNR.

Generalization of Pilot Symbol Encoding Technique

The pilot symbol encoding technique discussed above can be generalized to rational modulation indices of the form h=p/M, where p is an integer and M is the number of modulation levels. In addition, an illustrative example is given to show the effect of using a modulation index not equal to p/M. For convenience in the discussion, only full response signalling is considered.

If h=p/M and p is odd, then the phase state $\Phi_n$ for odd n is given by Equation 15. In order to force the modulator to return to the zero phase state at time $(n+1)T$, we must be able to find a symbol c from the set $\{\pm 1, \pm 3, \ldots, \pm(M-1)\}$ such that $cp\pi/M = -m\pi/M$ modulo $2\pi$. This is equivalent to finding an integer c such that $pc' + m' = 0$ modulo $2M$, where $c'=c+M$, $m'=m+M$, and both c' and m' are odd integers from the set $\{0, 1, \ldots, 2M-1\}$. It is easy to show that such a solution always exists. Consequently, one can always find a valid symbol from the signal alphabet to force the modulator to return to the zero phase at even symbol time. A similar analysis can be used to show that for an even integer p, it is also possible to find a valid channel symbol to return the modulator to the zero phase state in one step. Thus, it can be concluded that the proposed pilot symbol encoding technique can be used in all M-level CPM systems with a rational modulation index of h=p/M.

For modulation indices not equal to p/M, the pilot symbol encoding rules must be tailored to the particular value under consideration. As an illustrative example, we consider the case of a full response binary CPM schemes with a modulation index of h=¾. There are two possible sets of pilot symbol encoding rules and they are discussed as follows.

When h=¾, then the phase state at time nT, n odd, is of the form $$\phi_n = \frac{m\pi}{4} \mod 2\pi \quad (51)$$

where m ∈ {±1,±3}. Thus we can force $\phi_{n+1}$ to zero by making $c_{n+1}=-m$ a data dependent pilot symbol. In this case, one is in essence using a 4-level modulation for the pilot symbols. Some degradation in error performance is expected as a result.

Alternatively, one can use three pilot symbols $c_{n+1}, c_{n+2}, c_{n+3}$ to return the modulator to the zero phase state at time (n+3)T. The pilot symbol encoding rules in this case are 1. $c_{n+1}=c_{n+2}=c_{n+3}=-1$ if m=1,
2. $c_{n+1}=c_{n+2}=c_{n+3}=1$ if m=1,
3. $c_{n+1}=c_{n+2}=c_{n+3}=-1$ if m=3,
4. $c_{n+1}=c_{n+2}=c_{n+3}=1$ if m=-3, This approach requires 3 pilot symbols per frame and hence leads to a drop in the throughput of the modem. However, both the data and pilot symbols are chosen from the same set of {±1} symbols.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. Apparatus for transmitting and receiving digital information over mobile communication channels, said apparatus comprising:

(a) a pilot symbol insertion device for periodically inserting data dependent pilot symbols into frames of digital data for subsequent channel estimation;

(b) a continuous phase modulator for modulating and transmitting over a mobile communication channel the frames of digital data, wherein said pilot symbol insertion device uses data dependent pilot symbols to force the continuous phase modulator to return periodically to a set of known phase states;

(c) means for receiving and filtering the transmitted data;

(d) a channel estimator for estimating the channel amplitude and phase distortion from the received pilot signal at different time instants; and (e) means for demodulating the received signal.

2. Apparatus according to claim 1, including a precoder employing a finite state precoding method whose operation is based upon a trellis structure substantially the same as the continuous phase modulation scheme and means for decoding the demodulated signal to recover the estimated transmitted data.

3. Apparatus according to claim 1, wherein said means for receiving and filtering includes an anti-aliasing filter designed to minimize the total intersymbol and adjacent channel interferences.

4. Apparatus according to claim 2, wherein the trellis structure is that of a full response continuous phase modulation scheme within an identical number of modulation levels and modulation index to that of the underlying continuous phase modulation scheme.

5. Apparatus according to claim 2, wherein transitions of the modulator joining at the same state are assigned different channel symbols, transitions emanating from the same state are assigned different channel symbols, transitions joining at the same state in the trellis have identical information content and transitions emanating from the same state in the trellis have their information content gray-coded in accordance with the squared Euclidean distances between waveform pairs associated with that state.

6. Apparatus according to claim 4, wherein transitions joining at the same state are assigned different channel symbols, transitions emanating from the same state are assigned different channel symbols, transitions joining at the same state in the trellis have identical information content, transitions emanating from the same state in the trellis have their information content gray-coded according to the squared Euclidean distances between waveform pairs associated with that state.

7. Apparatus according to claim 1, wherein said pilot symbol insertion device uses at least one pilot symbol for every N transmitted symbols to force the modulator to return periodically to a set of known phase states.

8. Apparatus according to claim 7, wherein the values of the pilot symbols may be substantially different from those used for the data symbols.

9. Apparatus according to claim 1, wherein said channel estimator provides periodic, minimum mean square channel estimates and being designed in accordance with one or more of following channel and system conditions: the signal to noise ratio, the Doppler frequency, the autocorrelation function of the channel fading process, the insertion points of the pilot symbols and the set of possible CPM waveforms of a given duration that center around the pilot symbol insertion point.

10. Apparatus according to claim 1, wherein said channel estimator includes a front end filter and an interpolation filter, said front end filter providing periodic, minimum mean square channel estimates and being designed in accordance with one or more of the following channel and system conditions: the signal to noise ratio, the Doppler frequency, the autocorrelation function of the channel fading process, the pilot symbol insertion points and the set of possible continuous phase modulation waveforms of a given duration that center around the pilot symbol insertion point.

11. Apparatus according to claim 10, wherein the interpolation filter when coupled with said front end filter provides channel estimates at all desired time instants.

12. Apparatus according to claim 11, wherein said interpolation filter is a digital filter the design of which is based upon the signal to estimation error ratio at the output of the front end filter, the Doppler frequency and the autocorrelation function of the fading process.

13. Apparatus according to claim 1, wherein said demodulator means is a coherent continuous phase modulation demodulator implemented in the form of a Viterbi algorithm which operates on the received signal and the channel estimates provided by the channel estimator.

14. Apparatus according to claim 1, wherein said demodulator means is a reduced complexity sequence estimator that operates on the received signal and the channel estimates provided by said channel estimator.

15. Apparatus according to claim 1, wherein said demodulator means is a multiple-pass joint data detector and channel estimator by which temporary decisions made by a data detector in the current demodulation pass are used to refine the channel estimates in the next demodulation pass.

16. Apparatus according to claim 15, wherein said demodulator means utilizes a Viterbi algorithm.

17. Apparatus according to claim 15, wherein said demodulator means utilizes a reduced complexity sequence estimator.

18. Apparatus according to claim 15, wherein said multiple channel joint data detector and channel estimator includes a front end channel estimation filter that provides periodic, minimum mean squared channel estimates based upon the signal to noise ratio, the Doppler frequency, the autocorrelation function of the channel fading process, the insertion points of the pilot symbols and the continuous phase modulation waveform of a given duration that center around the pilot symbol insertion point and specified by the previous demodulation attempt.

19. Apparatus according to claim 15, including an interpolation filter that uses the channel estimates provided by the front end channel estimation filter to generate minimum mean squared channel estimates at all instants according to the signal to estimation error ratio at the output of the first estimation filter, the Doppler frequency and the autocorrelation function of the fading process.

20. A method for transmitting and receiving digital information over mobile communication channels, said method comprising the steps of:

(a) encoding a stream of digital data including inserting periodically data dependent pilot symbols into frames of the digital data;

(b) performing continuous phase modulation on the frames of data, wherein inserting the data dependent pilot symbols forces the continuous phase modulation to return periodically to a set of known phase states;

(c) transmitting the modulated data over a mobile communication channel;

(d) detecting the transmitted data;

(e) estimating from the received pilot signal the channel's amplitude and phase distortion at different time instants;

(f) demodulating the received signal based upon the channel estimates provided by the channel estimator; and (g) decoding the demodulated signal.

21. A method according to claim 20, wherein said encoder includes a precoder based upon a trellis structure that is identical to that of the underlying continuous phase modulation scheme.

22. A method according to claim 20 wherein said trellis structure is that of a full response continuous phase modulation scheme with an identical number of modulation levels and modulation index to that of the underlying continuous phase modulation scheme.

23. A method according to claim 21, wherein transitions of the modulator joining at the same state are assigned different channel symbols, transitions emanating from the same state are assigned different channel symbols, transitions joining at the same state in the trellis have identical information content and transitions emanating from the same state in the trellis have their information content gray-coded in accordance with the squared Euclidean distances between waveform pairs associated with that state.

24. A method according to claim 20, wherein at least one pilot symbol is used for every N transmitted symbols to force the modulator to return periodically to a set of known phase states.

25. A method according to claim 20, wherein said channel estimating step provides periodic, minimum mean square channel estimates in accordance with one or more of the signal to noise ratio, the Doppler frequency, the autocorrelation function of the channel fading process, the insertion points of the pilot symbols and the set of possible continuous phase modulation waveforms of a given duration that center around the pilot symbol insertion point.

26. A method according to claim 25, wherein said channel estimating step further includes a second filtering step which when combined with said means square estimates provides channel estimates at all desired time instants.

27. A method according to claim 20, wherein said demodulating step utilizes a Viterbi algorithm that operates on the received signal and the channel estimates.

28. A method according to claim 20, wherein said demodulating step utilizes a reduced complexity sequence estimator that operates on the received signal and the channel estimates.

29. A method according to claim 20, wherein said demodulating step includes a multiple-pass joint data detector and channel estimator by which a temporary decision made by the data detector in the current demodulation pass are used to refine the channel estimates in the next demodulation pass.

* * * * *